A. M. CANDY.
ELECTRIC ARC WELDING SYSTEM.
APPLICATION FILED SEPT. 3, 1919.
1,343,194.   Patented June 15, 1920.
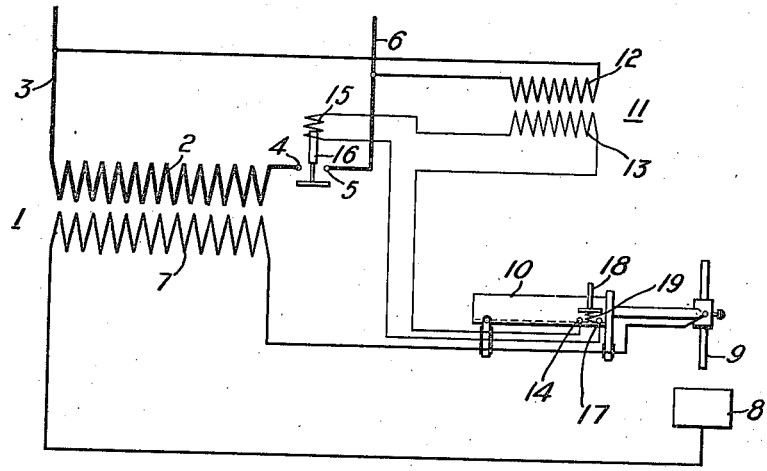
WITNESSES:
H. J. Shelhamer
O. E. Bee.
INVENTOR
Albert. M. Candy
BY
Wesley J. Carr
ATTORNEY

UNITED STATES PATENT OFFICE.

ALBERT M. CANDY, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC-ARC-WELDING SYSTEM.

1,343,194.     Specification of Letters Patent.    Patented June 15, 1920.

Application filed September 3, 1919. Serial No. 321,460.

*To all whom it may concern:*

Be it known that I, ALBERT M. CANDY, a citizen of the United States, and a resident of Wilkinsburg, in the county of Allegheny and State of Pennsylvania, have invented a new and useful Improvement in Electric-Arc-Welding Systems, of which the following as a specification.

My invention relates to arc welding systems and, more particularly, to arc welding systems employing alternating current. The primary object of my invention is to provide positive protection for the operator against shock hazards which may be experienced in electric-arc welding systems.

It has been found that it is advantageous to employ a relatively high voltage in an alternating-current arc welding system on account of the fact that the high voltage facilitates the starting and the sustaining of an arc. Although the voltages ordinarily employed are not excessive, they introduce a definite shock hazard which may be obviated by employing a welding system incorporating a device embodying my invention.

One object of my invention resides in the provision of means for maintaining open-circuit conditions which are under control of the operator and which necessitate an operation being performed by him in order to establish operating conditions in the welding system.

Another object of my invention is to provide means for protecting the operator which shall not unduly complicate the system and which shall not interfere with the operation to obtain strong and homogeneous welds.

A still further object of my invention is to incorporate a device in an alternating-current welding system which is particularly desirable where a distorted wave form is employed by utilizing a high magnetizing current.

With these and other objects in view, my invention will be more fully described and illustrated in the single figure of the drawing which is a diagram of a welding system embodying my invention.

In practising my invention, I may provide a welding system by employing a transformer having its secondary winding connected to a plurality of electrodes or to an electrode and a piece of work. The primary winding may be connected to a suitable source of alternating-current supply, and an instrument transformer may have its primary winding connected, in parallel relation, to the primary winding of the welding transformer. The secondary winding of the instrument transformer may be connected to a coil adapted to actuate a relay switch which opens and closes the circuit of the primary winding of the welding transformer. The circuit embodying the secondary winding of the instrument transformer and the coil which operates the relay switch may be controlled by a manually-operable-switch which may be disposed in or on an electrode holder or a similar device which is usually employed to carry the welding electrode. By employing a circuit of such character, the operator is protected at all times because of the fact that the manually-operable-switch maintains open-circuit conditions, except when intentionally closed by the operator. The broad object of my invention is to provide protection for the operator by employing a manually-operable-switch which requires a physical effort on the part of the operator in order to close the welding circuit and which he can, at no time, forget to operate.

In the drawing is shown a welding system comprising a welding transformer 1 having a primary winding 2, one end of which may be connected, by a conductor 3, to a supply circuit (not shown). The other end of the winding 2 may be connected to a contact member 4, and another contact member 5 may be connected, by a conductor 6, to the other side of the supply circuit. A secondary winding 7 may be connected to a piece of work 8 and to an electrode 9 carried by an electrode holder 10. An instrument transformer 11 may be employed and its primary winding 12 may be connected in parallel relation to the winding 2 of the welding transformer 1. A secondary winding 13 of the instrument transformer 11 may be connected, at one side, to a contact 14, and the other side may be connected, through a coil 15, which is adapted to actuate a switch 16, to another contact member 17. The contacts 14 and 17 may be located as shown, in the electrode holder 10 and may be bridged by a push button 18 which is normally held in spaced relation to the contacts 14 and 17 by a spring 19.

In operating the above described welding system, the primary winding 2 of the welding transformer 1 may be connected to a suitable source of supply by the conductors 3 and 6, the circuit thereof being normally opened and adapted to be closed by the switch 16. When it is desired to weld, the push button 18 may be depressed against the action of the spring 19 and the contacts 14 and 17 be bridged to close the circuit through the secondary winding 13 of the instrument transformer 11, thereby energizing the coil 15 which actuates the switch 16 to bridge the contact-members 4 and 5 and thus close the primary circuit of the welding transformer 1. It will be appreciated, of course, that the primary winding 12 of the instrument transformer 11 is, at all times, energized because it is connected to the supply circuit by the conductors 3 and 6. In order to interrupt the welding operations, it is only necessary for the operator to release the pressure upon the push button 18, thereby opening the circuit of the secondary winding 13 of the instrument transformer and deënergizing the switch-actuating coil 15.

It will be appreciated from the foregoing description that a positive protection is provided for the operator on account of the fact that, in order to start and maintain welding conditions, it is necessary for him to perform the act of closing the circuit by closing a switch which is held open by means of a spring. If, for any reason, the welding operations are interrupted, on account of the operator's attention being diverted, it is natural for him to open the circuit without special attention, as it requires a continuous pressure on the switch, operable by him, in order to maintain an energized welding circuit. It should be noted that my invention contemplates the entire deënergizing of the welding circuit when the operator is not welding, rather than the reduction of the potential normally maintained between the electrodes. I am aware of the fact that welding circuits have been disclosed in which means have been provided to obtain a relatively high starting voltage and a subsequent lower operating voltage, together with a relatively low open-circuit voltage, but my invention contemplates the establishing of zero potential when a welding operation is not being performed.

Although I have shown and specifically described a welding system which embodies my invention, it is obvious that minor changes may be made in the disposition and connection of the elements without departing from the spirit or scope of my invention, and I desire, therefore, that no limitations shall be imposed except such as are indicated in the appended claims.

I claim as my invention:—

1. An arc welding system comprising a plurality of inductively related windings, a plurality of electrodes connected to one of the windings, means for maintaining zero potential between the electrodes when one of the windings is connected to a source of current and manually-operable means for establishing the potential between the electrodes, occasioned by the winding connected thereto.

2. An arc welding system comprising a transformer having primary and secondary windings, a plurality of electrodes connected to the secondary winding, means for maintaining the primary circuit open when it is connected to a supply circuit and means for closing the circuit.

3. An arc welding system comprising a plurality of inductively related windings, one of which is connected to a plurality of electrodes and the other of which is connected to a supply circuit, a normally open switch disposed in the circuit of the winding connected to the supply circuit, a switch-actuating coil, a normally open energizing circuit therefor and manually-operable means for closing the energizing circuit.

4. An arc welding system comprising a transformer having primary and secondary windings, a plurality of electrodes connected to the secondary winding, an auxiliary transformer having a primary winding connected, in parallel relation, to the primary winding of the first mentioned transformer, a coil connected to the secondary winding of the auxiliary transformer and adapted to be energized thereby, a normally open switch disposed in the primary winding of the first mentioned transformer which is adapted to be actuated to close the circuit by the coil, and manually-operable means for normally maintaining the energizing circuit of the coil open.

5. An arc welding system comprising a welding transformer having primary and secondary windings, a plurality of electrodes connected to the secondary windings, an auxiliary transformer having primary and secondary windings, the primary winding being connected in parallel relation to the primary winding of the welding transformer, a coil connected in series with the secondary winding of the auxiliary transformer, a relay switch adapted to maintain the primary winding of the welding transformer on open circuit and adapted to be actuated by the coil, and a manually operable switch which maintains the energizing circuit of the coil normally open.

In testimony whereof, I have hereunto subscribed my name this 26th day of Aug., 1919.

A. M. CANDY.